United States Patent [19]

Isomura

[11] Patent Number: 5,038,240

[45] Date of Patent: Aug. 6, 1991

[54] THIN APPARATUS FOR ETCHED ON APPARATUS BODY RECORDING MEDIUM WITH WIRING PATTERN

[75] Inventor: Akihiro Isomura, Oome, Japan

[73] Assignee: Kabushiki Kaisha Toshiba, Kawasaki, Japan

[21] Appl. No.: 398,980

[22] Filed: Aug. 28, 1989

[30] Foreign Application Priority Data

Aug. 31, 1988 [JP] Japan ................................ 63-216836

[51] Int. Cl.⁵ ............................................. G11B 17/02
[52] U.S. Cl. ............................... 360/99.08; 360/99.04; 360/106
[58] Field of Search ............... 360/97.01, 99.01, 99.04, 360/99.08, 99.11, 106; 310/DIG. 6

[56] References Cited

U.S. PATENT DOCUMENTS 4,669,009 5/1987 Naoi et al. ..................... 360/99.02
4,873,596 10/1089 Harada et al. .................. 360/99.04

FOREIGN PATENT DOCUMENTS 61-58840 4/1986 Japan .
63-40852 3/1988 Japan .
63-40865 3/1988 Japan .
63-113879 5/1988 Japan .

OTHER PUBLICATIONS

Nikkei Mechanical 1988 6 27.

*Primary Examiner*—David J. Severin
*Attorney, Agent, or Firm*—Oblon, Spivak, McClelland, Maier & Neustadt

[57] ABSTRACT

An apparatus for driving a disk-type recording medium includes a base plate including a magnetic material, a spindle mechanism, formed on the base plate, for rotating the recording medium, and a controller for controlling the spindle mechanism. An insulating film is formed on the base plate, and an electric wiring pattern is formed on the insulating film. The spindle mechanism includes stator coils magnets, a rotor, a bearing, and a spindle shaft. The stator coils and the bearing are fixed on the base plate, the magnets are fixed on the rotor, the rotor is fixed on the spindle shaft, the spindle shaft is supported by the bearing, and the stator coils are connected to the writing pattern. Parts of the controller are mounted on the base plate and connected to the wiring pattern. With this arrangement, the entire apparatus can be made thin, mounting positional precision of the respective parts can be improved, workability is improved, and therefore a manufacturing cost can be reduced.

7 Claims, 7 Drawing Sheets

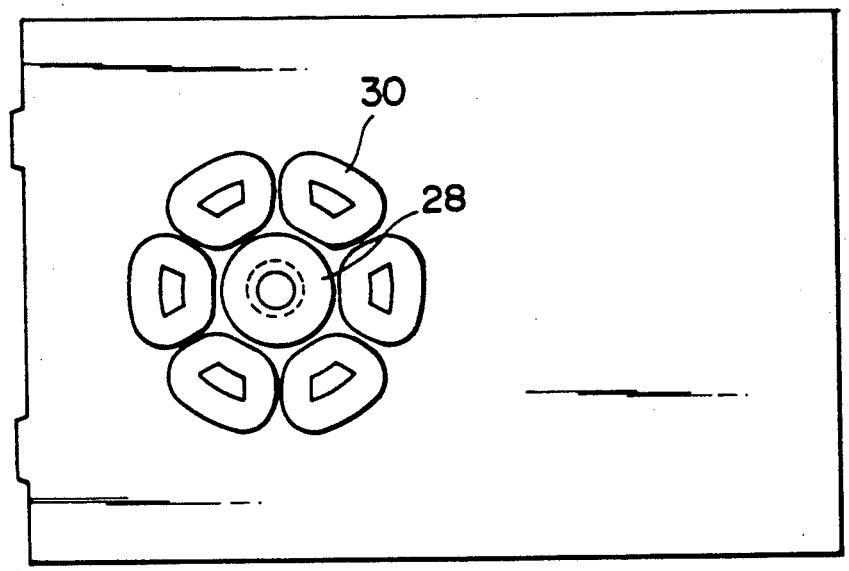
F I G. 6
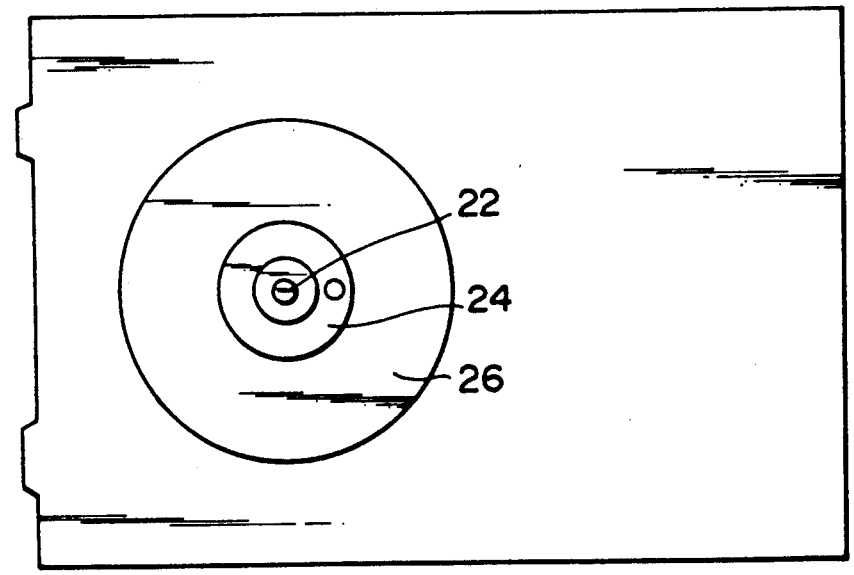
F I G. 7

THIN APPARATUS FOR ETCHED ON APPARATUS BODY RECORDING MEDIUM WITH WIRING PATTERN

BACKGROUND OF THE INVENTION

1. Field of the Invention

The present invention relates to an apparatus for driving a disk-type recording medium and more specifically, the apparatus which can be easily manufactured.

2. Description of the Related Art

A conventional floppy disk driving apparatus for driving a disk-type recording medium such as 3.5-inch floppy disk is arranged as shown in FIG. 1. That is, a spindle mechanism 111 and a carriage mechanism 112 as main portions are mounted on a frame 110 which constitutes an apparatus main body.

The frame 110 is generally made of an aluminum alloy diecast or a thick metal plate. The spindle mechanism 111 is for mounting and rotating a floppy disk and comprises a chucking unit 113 and a spindle motor 120 having a spindle shaft 114. The floppy disk is loaded in a receiver which vertically moves with an eject plate 115. In the receiver, the floppy disk is then chucked by the chucking unit 113 of the spindle mechanism 111 and rotated by the spindle motor 120.

The carriage mechanism 112 for moving the magnetic heads onto a destination track on the floppy disk includes an S0-side magnetic head 116 which is arranged at a lower end portion of a carriage of the carriage mechanism 112 to perform a read/write operation to a S0-side of the floppy disk and an S1-side magnetic head which is arranged to vertically face the S0 head 116 at a upper end portion of the carriage to perform the read/write operation to a S1-side of the floppy disk.

In this conventional apparatus, the spindle motor of the spindle mechanism 111 is fixed as an independent part on a circuit board 124 for the necessity of wiring, and the circuit board 124 is fixed on the frame 110. The carriage mechanism 112 is directly fixed on the frame 110. In a floppy disk driving apparatus, precision of a positional relationship from the magnetic heads to the spindle shaft 114 of the spindle motor is important. Since the motor is assembled as an independent part, however, workability is poor in order to obtain required precision.

In a conventional apparatus shown in FIG. 2, a spindle motor 120 of a spindle mechanism 111 includes a spindle shaft 114, a rotor 121 for transmitting rotation to the spindle shaft 114, a magnet 122 mounted under the rotor, a motor circuit board 124, and a stator coil 123 arranged on the motor circuit board 124. The spindle shaft 114 is supported by a bearing 126 fitted in a frame 110. The motor circuit board 124 is an insulating board consisting of, e.g., a glass epoxy resin and fixed on the frame 110 of a magnetic material steel plate in order to form a magnetic path.

The rotor 121 is rotated by an electromagnetic effect of the magnet 122 and the coil 123 to rotate the spindle shaft 114. As a result, a floppy disk 125 is rotated while it is chucked by a chucking unit 113. In this apparatus, since the motor 120 is formed integrally with the frame 110, the above problem of precision in positional relationship is more or less improved. However, since a glass epoxy insulating board is required as the motor circuit board, a manufacturing cost is increased. In addition, since the height of the apparatus is increased by the thickness of the circuit board, the apparatus becomes bulky.

In addition to the above apparatuses, a technique relating to the present invention is disclosed in Published Unexamined Japanese Utility Model Application No. 63-40852. This application describes that a rotating means and a chucking means are provided to a rotor. An apparatus in which a motor is mounted on a base plate consisting of a magnetic material and having an insulating layer is disclosed in Published Unexamined Japanese Patent Application No. 63-113879 or Published Unexamined Japanese Utility Model Application No. 61-58840. In these conventional apparatuses, however, a spindle shaft of a motor extends through the base plate. Especially in Published Unexampled Japanese Patent Application No. 63-113879, electronic parts are mounted only on the lower surface of the base plate. For this reason, a thin or compact apparatus cannot be obtained by these techniques.

The technique shown in FIG. 2 is described in Published Unexamined Japanese Patent Application No. 63-40865 and "Nikkei Mechanical", June 27, 1988. Published Unexamined Japanese Patent Application No. 63-40865 discloses a motor in which a turntable and a rotor boss are integrally molded and a rotor is mounted on the periphery of the integral unit. In this technique, however, a wiring circuit board is required in addition to a frame or a base plate. Similarly, in the technique described in "Nikkei Mechanical", a circuit board mounting electronic parts of a motor controller and other circuits is fixed on a frame.

That is, the conventional apparatuses for driving a disk-type recording medium has many problems to be solved in terms of, e.g., mounting precision, mounting workability, and the shape or size of an apparatus.

SUMMARY OF THE INVENTION

It is an object of the present invention to provide an apparatus for driving a disk-type recording medium, which can be made thin as a whole, can improve mounting precision of each part, can improve workability, and therefore can decrease a manufacturing cost.

In order to achieve the above object of the present invention, the apparatus includes a base plate including a magnetic material, a spindle mechanism formed on the base plate and including a spindle motor for rotating the recording medium, and a controller for controlling the spindle mechanism. An insulating film is formed on the base plate, and an electric wiring pattern is formed on the insulating film. The spindle mechanism has stator coils, magnets, a rotor, a bearing, and a spindle shaft. The stator coils and the bearing are fixed on the base plate, the magnets are fixed on the rotor, the rotor is fixed on the spindle shaft, the spindle shaft is supported by the bearing, and the stator coils are connected to the wiring pattern. Electronic parts of the controller are mounted on the base plate and connected to the wiring pattern.

As described above, the apparatus for driving a disk-type recording medium according to the present invention adopts the structure in which the frame of the apparatus is used as a motor base plate of the spindle motor and a signal processor circuit board. Therefore, since a motor circuit board for a motor controller and a circuit board for processing a signal can be omitted, the overall apparatus can be made thin, and a manufacturing cost can be decreased. In addition, since parts can be mounted from one direction, workability is improved.

Furthermore, since the spindle motor can be directly mounted on the frame of the apparatus, precision of a positional relationship with respect to another part mounted on the frame, e.g., a carriage mechanism can be improved.

BRIEF DESCRIPTION OF THE DRAWINGS

FIG. 6 is a plan view showing a coil and a bearing of the mounted spindle motor;

FIG. 7 is a plan view showing a mounted rotor and a chucking mechanism;

DETAILED DESCRIPTION OF THE PREFERRED EMBODIMENTS

An apparatus for driving a disk-type recording medium according to the present invention will be described in detail below by exemplifying a 3.5-inch floppy disk driving apparatus with reference to the accompanying drawings.

Figure 3:
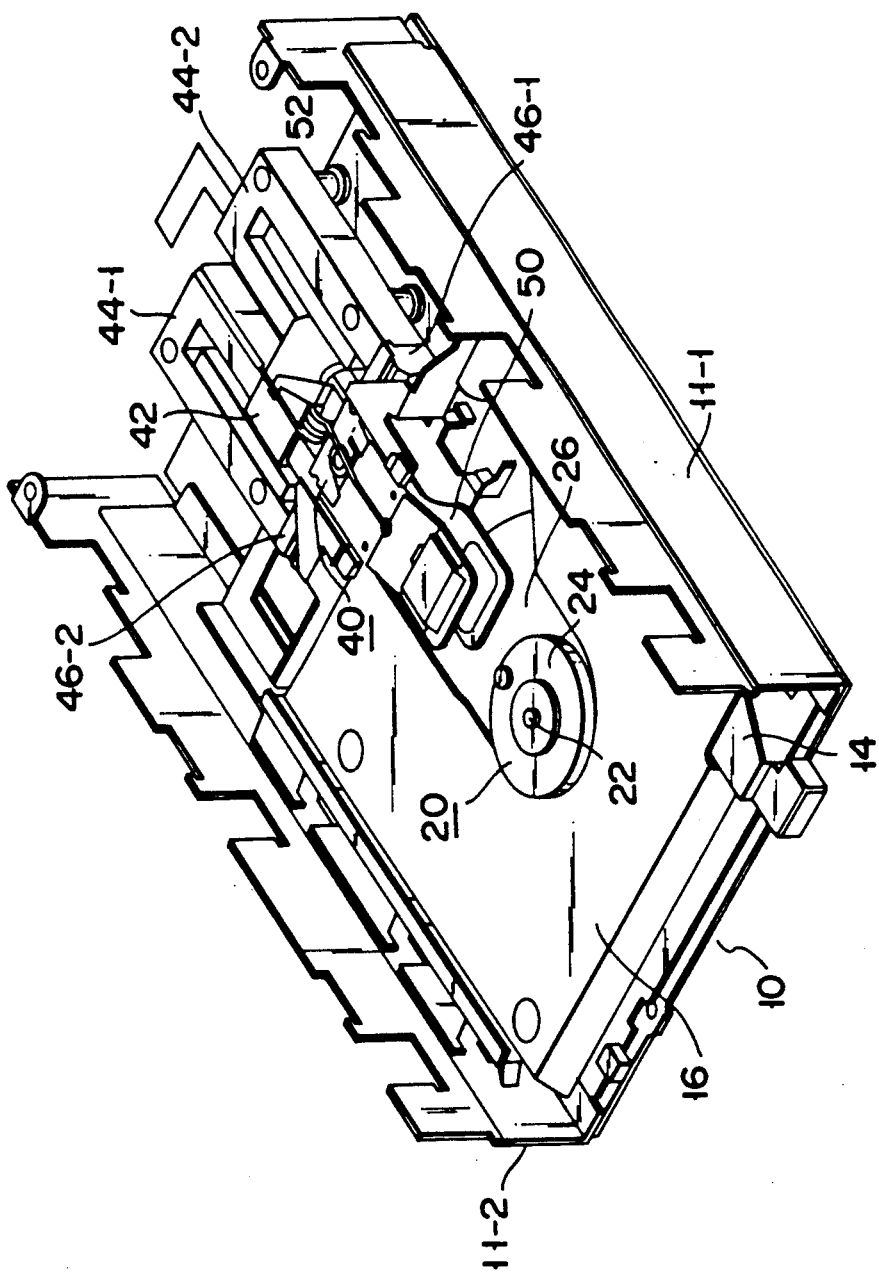
FIG. 3 is a perspective view showing an arrangement of a floppy disk driving apparatus according to an embodiment of the present invention.

FIG. 3 is a perspective view showing a arrangement of a floppy disk driving apparatus according to the first embodiment of the present invention. Referring to FIG. 3, vertically extending side frames 11-1 and 11-2 are fixed on side portions in the longitudinal direction of a base frame 10, respectively. The base frame 10 and the side frames 11-1 and 11-2 constitute the overall frame.

A spindle motor 20 and a carriage mechanism 40 are mounted on the base frame 10, the spindle motor including, e.g., a spindle shaft 22, a chucking mechanism 24, and a rotor 26. The carriage mechanism 40 is constituted by an S0/S1 head unit 50, a support unit 52, a voice coil motor, and the like. The S0 and S1 head of the S0/S1 head unit 50 for respectively performing the read/write operation to the S0 and S1 sides of the floppy disk are arranged at a the lower and upper end portions of a carriage, respectively.

The voice coil motor is constituted by a coil 42, U-shaped yokes 44-1 and 44-2, I-shaped yokes 46-1 and 46-2, and the like. An eject plate 14 is arranged above the rotor 26 of the spindle motor 20, and a cover 16 having an opening portion at a position corresponding to the chucking mechanism 24 of the spindle motor 2 is arranged above the eject plate 14.

Figure 1:
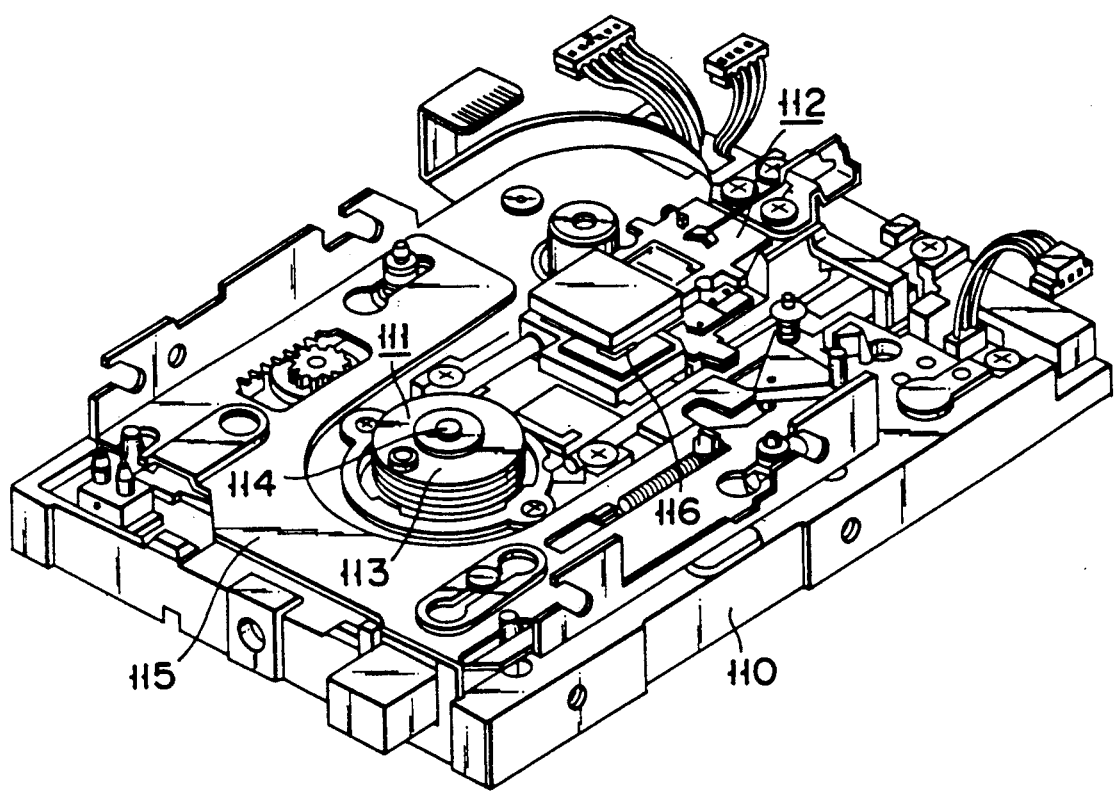
FIG. 1 is a perspective view showing an arrangement of a conventional floppy disk driving apparatus.
Figure 2:
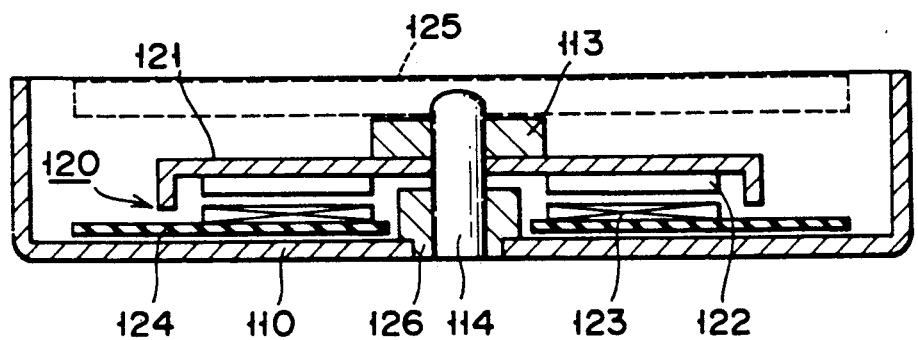
FIG. 2 is a side sectional view showing a schematic arrangement of a spindle motor unit of another conventional floppy disk driving apparatus.
Figure 4:
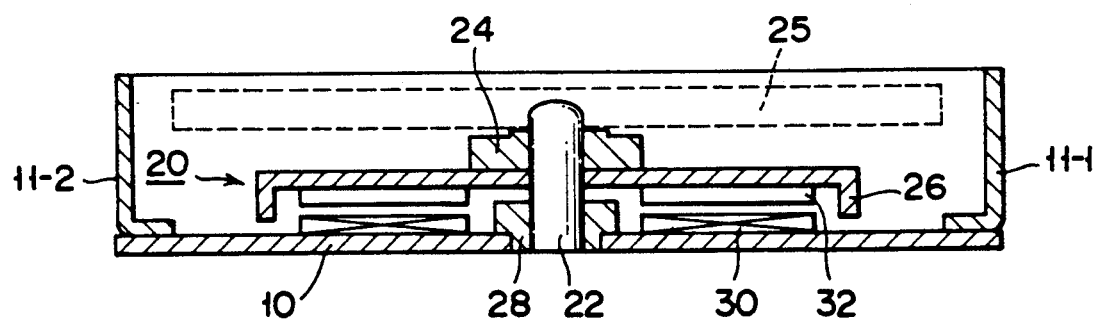
FIG. 4 is a side sectional view showing a schematic arrangement of a spindle motor unit of the apparatus according to the first embodiment.

FIG. 4 is a side sectional view showing a schematic arrangement of a state of the first embodiment obtained when the spindle motor 20 is mounted on the frame. As shown in FIG. 4, the base frame 10 constituting the apparatus main body is used as a motor circuit board. The base frame 10 is a magnetic material steel plate having sufficient strength, an insulating film including, e.g., a resin is formed on its surface and a circuit pattern is formed on the insulating film.

A plurality of coils 30 of the spindle motor are directly fixed to the base frame 10 and connected to the circuit pattern on the insulating film. A bearing is fitted in the opening portion to support the motor assembly including the spindle shaft 22. The side frames 11-1 and 11-2 of, e.g., a steel plate, an aluminum plate, or a resin plate, are fixed on both the sides of the base frame 10.

A procedure of manufacturing the apparatus according to the first embodiment of the present invention will be described below with reference to FIGS. A to G. FIGS. 5A to 5G schematically show a manufacturing procedure of, mainly, the spindle motor unit.

Figure 5A:
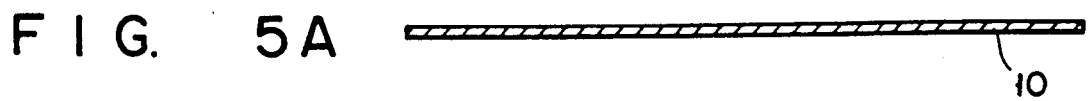
FIGS. 5A to 5G are schematic side sectional views showing a manufacturing procedure of the apparatus according to the first embodiment.
Figure 5B:
Figure 5C:

As shown in FIG. 5A, a thick magnetic material steel plate 10 is prepared as a base plate. The steel plate is used in order to form a magnetic path of the stator coil. A shown in FIG. 5B, an insulating film is formed on the steel plate 10 by, e.g., coating or spraying, and a metal layer of copper is formed thereon. As in normal processing for a circuit board, the metal layer is etched to form a circuit pattern on the insulating film. Thereafter, as shown in FIG. 5C, the steel plate 10 is punched by a press machine in order to form holes for various pins or machine screws and a hole for mounting the spindle motor.

Figure 5D:
Figure 5E:
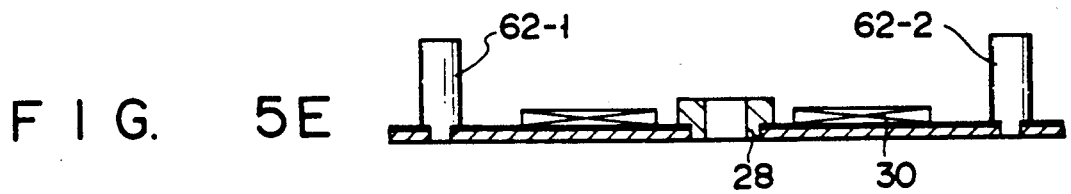

As shown in FIG. 5D, the stator coils are mounted on the base frame 10 and connected to the circuit pattern above the base frame 10. As well known, the floppy disk drive includes a spindle motor controller, a head driver, a seek controller, a read/write circuit or the like and accesses the floppy disk under control of the floppy disk controller. In this process, circuit elements such as ICs and resistors constituting a motor controller 72, a data processing circuit 70 and the like are mounted on the base frame 10, in addition to the stator coils. As shown in FIG. 5E, the bearing 28 of the spindle motor 20, the carriage positioning pins 62-1 to 62-4, and disk positioning pins 63-1 to 63-4 are caulked to the base frame 10. FIGS. 6 and 7 show states of only the motor unit mounted on the base frame 10.

In the floppy disk driving apparatus, a positional relationship between the spindle shaft of the spindle motor 20 and the head unit 50 mounted on the carriage mechanism 40 must be precise. According to this procedure, since the bearing and positioning holes are simultaneously punched and the bearing 28 and positioning pins 62-1 to 62-4 are caulked, a precise positional relationship is obtained. A part of the motor assembly including the spindle shaft 22 on which the rotor 26 and the chucking mechanism 24 are fixed is prepared. In this case, the magnet 32 is mounted on the rotor 26.

Figure 5F:
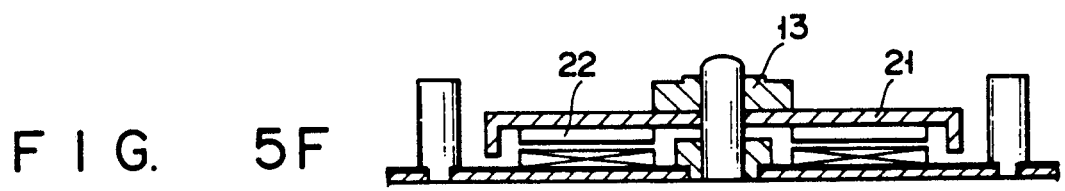
Figure 8:
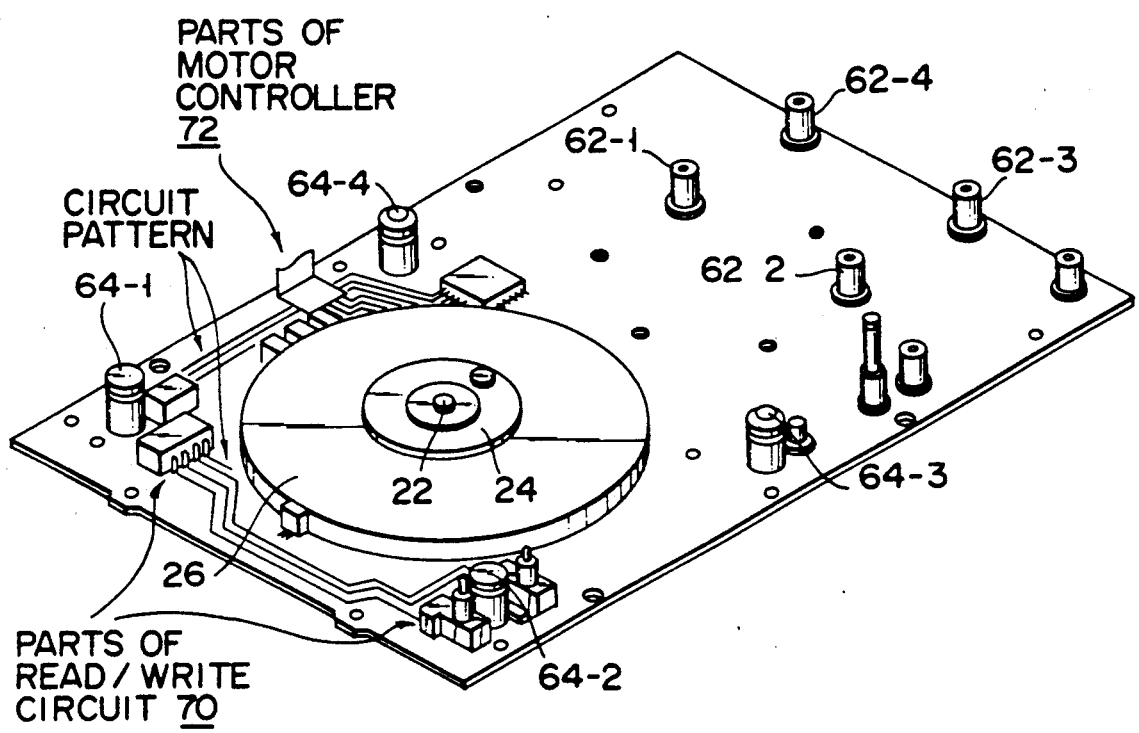
FIG. 8 is a perspective view showing a state in which the spindle motor, a motor controller, and a signal processor are mounted.
Figure 9:
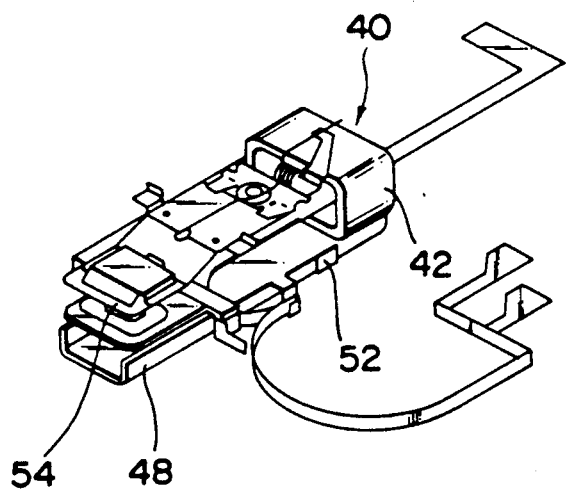
FIG. 9 is a perspective view showing an arrangement of a carriage mechanism to be mounted.

In addition, a part of the carriage mechanism 40 shown in FIG. 9 is prepared. In the part of the carriage mechanism 40, heads 54 and a coil 42 are mounted on a support unit 52 on a guide 48. As shown in FIG. 5F, the spindle shaft 22 on which the rotor 26 and the chucking mechanism 24 are mounted is inserted in the bearing 28. As a result, the spindle shaft 22 is rotatably supported by the bearing 28. The bottom end of the spindle does not substantially project from the base frame 10. FIG. 8 is a perspective view showing a mounted state of the parts on the base frame 10. Since the respective parts can be mounted from one direction, i.e., from the above, workability is improved.

Thereafter, the part of the carriage mechanism 40 shown in FIG. 9 is fixed on the base frame 10 by machine screws. At this time, the part of the carriage mechanism 40 is fixed by using a jig on the basis of the positioning pins. As a result, a precise positional relationship can be obtained between the head unit 50 and the spindle shaft 22. The yokes 44-1 and 44-2 each having a magnet are fixed on the positioning pins 62-1 to 62-4 so that one end of each of the yokes is inserted in the coil 42. The I-shaped yokes 46-1 and 46-2 are mounted on the U-shaped yokes 44-1 and 44-2, respectively, thereby forming the voice coil motor from the coil 42, and the yokes 44-1, 44-2, 46-1 and 46-2 having the magnets.

Figure 5G:
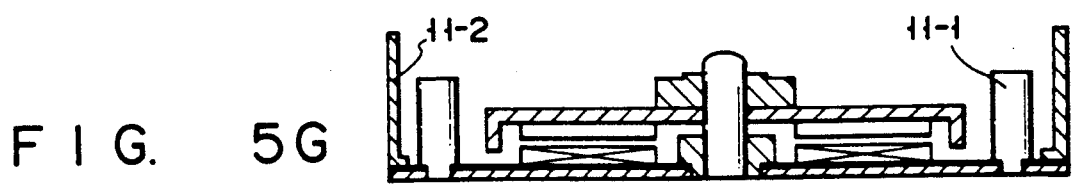
Figure 10:
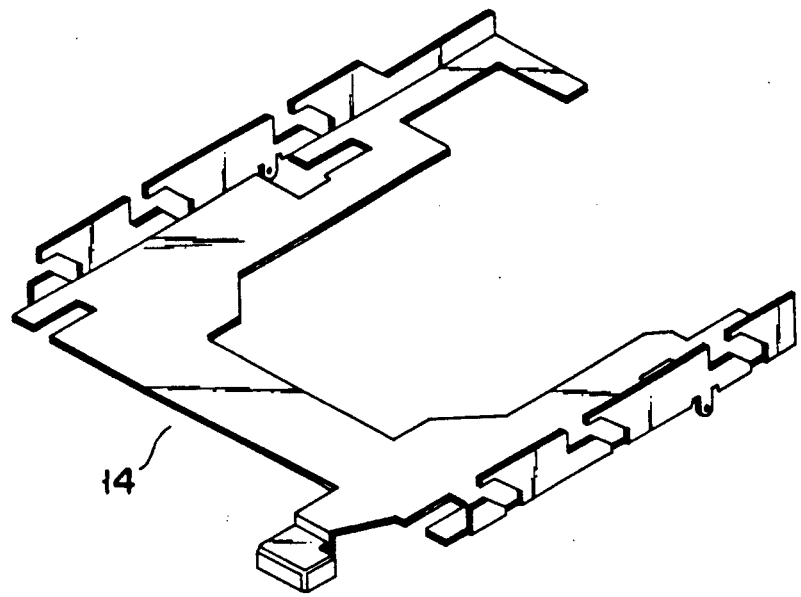
FIG. 10 is a perspective view showing an eject plate.

As shown in FIG. 5G, the side frames 11-1 and 11-2 are mounted on the base frame 10. Thereafter, the eject plate 14 shown in FIG. 10 is mounted, and the receiver 16 is mounted thereon. As a result, the floppy disk driving apparatus as shown FIG. 3 is obtained.

As is apparent from the above description, the apparatus for driving a disk-type recording medium according to the present invention can be manufactured with good workability. In addition, precision of the positional relationship between the head and the spindle shaft 22 is high. In the apparatus having the above structure, the frame of the apparatus main body also serves as the base plate for supporting the spindle motor 20 and the circuit elements can be mounted on the frame of the apparatus. Therefore, an exclusive base plate conventionally used for a motor can be omitted to decrease a manufacturing cost. Furthermore, the spindle motor can be directly mounted on the frame. Therefore, the height of a portion of the spindle motor 20 can be reduced smaller than those of conventional apparatuses. As a result, the entire apparatus can be made thin.

Figure 11:
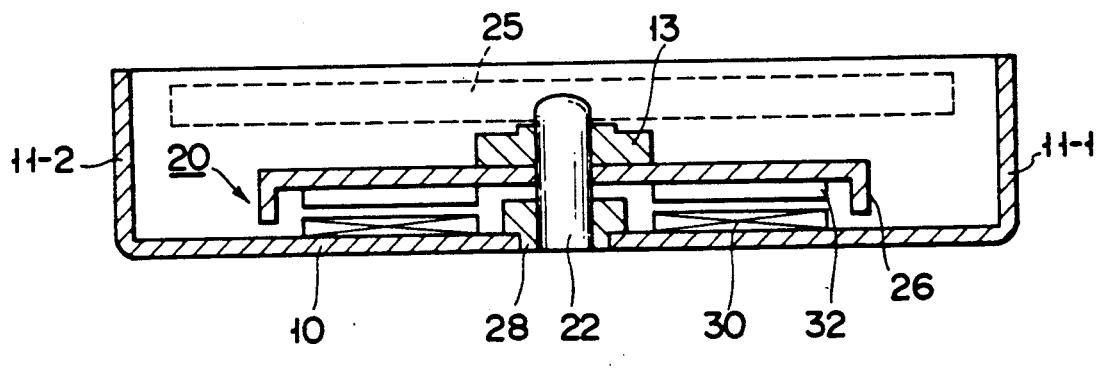
FIG. 11 is a side sectional view showing a schematic arrangement of a floppy disk driving apparatus according to a second embodiment of the present invention.

FIG. 11 is a schematic side sectional view showing the second embodiment of the present invention. In the second embodiment, the side frames 11-1 and 11-2 used in the first embodiment are not used. Instead, a steel plate 10 is simultaneously punched and bent by a press machine, thereby forming side frames. As a result, a step of mounting side frames can be omitted.

The present invention is not limited to the above embodiments but can be applied to another recording/reproducing apparatus having a spindle mechanism such as an optical disk or a removable hard disk apparatus.

What is claimed is:

1. An apparatus for driving a disk-type recording medium, comprising:
    a base plate including a magnetic material and having an insulating film formed on said base plate and an electric wiring pattern formed on said insulating film, said base plate constituting an apparatus main body;
    a spindle mechanism, formed on said base plate and having stator coils, magnets, a rotor, a bearing, and a spindle shaft, for rotating said recording medium, said stator coils and said bearing being fixed on said base plate, said magnets being fixed on said rotor, said rotor being fixed on said spindle shaft, said spindle shaft being rotatably supported by said bearing, and said stator coils being connected to said wiring pattern; and
    a controller for electrically controlling said spindle mechanism, parts of said controller being mounted on said base plate and connected to said wiring pattern.

2. An apparatus according to claim 1, wherein said spindle mechanism further comprises a chucking mechanism, fixed on said spindle shaft, for chucking said recording medium.

3. An apparatus according to claim 1, further comprising side plates fixed on opposing end portions of said base plate and extending upward.

4. An apparatus according to claim 1, wherein said base plate includes opposing end portions bent upward.

5. An apparatus for driving a disk-type recording medium, comprising:
    a base plate including a magnetic material and having an insulating film formed on said base plate and an electric wiring pattern formed on said insulating film;
    a spindle mechanism, formed on said base plate and having stator coils, magnets, a rotor, a bearing, and a spindle shaft, for rotating said recording medium, said stator coils and said bearing being fixed on said base plate, said magnets being fixed on said rotor, said rotor being fixed on said spindle shaft, said spindle shaft being rotatably supported by said bearing, and said stator coils being connected to said wiring pattern; and
    a controller for electrically controlling said spindle mechanism, parts of said controller being mounted on said base plate and connected to said wiring pattern;
    a plurality of positioning pins; and
    a carriage mechanism having a head, positioned with reference to said plurality of positioning pins, and mounted on said base plate.

6. An apparatus according to claim 5, wherein said carriage mechanism includes a voice coil motor.

7. An apparatus according to claim 5, further comprising a processor for processing a signal obtained from said recording medium via said head, parts of said processor being mounted on said base plate and connected to said wiring pattern.

* * * * *

UNITED STATES PATENT AND TRADEMARK OFFICE
CERTIFICATE OF CORRECTION

PATENT NO. : 5,038,240
DATED : August 6, 1991
INVENTOR(S) : Akihiro Isomura

It is certified that error appears in the above-identified patent and that said Letters Patent is hereby corrected as shown below:

On Title Page, and Column 1, lines 1-3, should read --THIN APPARATUS FOR DRIVING DISK-TYPE RECORDING MEDIUM--.

Signed and Sealed this

Ninth Day of March, 1993

Attest:

STEPHEN G. KUNIN

*Attesting Officer*    *Acting Commissioner of Patents and Trademarks*